(12) United States Patent
Dietrich et al.

(10) Patent No.: US 9,672,537 B1
(45) Date of Patent: Jun. 6, 2017

(54) DYNAMIC CONTENT CONTROL IN AN INFORMATION PROCESSING SYSTEM BASED ON CULTURAL CHARACTERISTICS

(71) Applicant: EMC Corporation, Hopkinton, MA (US)

(72) Inventors: David Dietrich, Hopedale, MA (US); Ronald Wilfred Reidy, Hopkinton, MA (US); Beibei Yang, Marlborough, MA (US); Barry William Heller, Medway, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/567,669

(22) Filed: Dec. 11, 2014

Related U.S. Application Data

(63) Continuation-in-part of application No. 14/225,959, filed on Mar. 26, 2014.

(51) Int. Cl.
*G06Q 30/00* (2012.01)
*G06Q 30/02* (2012.01)

(52) U.S. Cl.
CPC .................. *G06Q 30/0271* (2013.01)

(58) Field of Classification Search
CPC .................................. G06Q 30/0271
See application file for complete search history.

(56) References Cited

U.S. PATENT DOCUMENTS

| | | | | |
|---|---|---|---|---|
| 2007/0078849 | A1* | 4/2007 | Slothouber | G06F 17/30867 |
| 2009/0132559 | A1* | 5/2009 | Chamberlain | G06Q 30/02 |
| 2010/0017386 | A1* | 1/2010 | Anderson | G06F 17/3071 |
| | | | | 707/E17.017 |
| 2010/0331146 | A1* | 12/2010 | Kil | G06Q 30/02 |
| | | | | 482/8 |
| 2012/0123830 | A1* | 5/2012 | Svendsen | G06Q 30/0252 |
| | | | | 705/14.5 |

OTHER PUBLICATIONS

W.W. Moe et al., "Uncovering Patterns in Cybershopping," California Management Review, Jul. 2001, pp. 106-117, vol. 43, No. 4.
W.W. Moe et al., "Fast-Track Article Using Advance Purchase Orders to Forecast New Product Sales," Marketing Science, Jan. 2002, pp. 347-364, vol. 21, No. 3.

(Continued)

*Primary Examiner* — Bennett Sigmond
*Assistant Examiner* — Scott C Anderson
(74) *Attorney, Agent, or Firm* — Ryan, Mason & Lewis, LLP

(57) ABSTRACT

A dynamic content controller is configured for communication with one or more data sources. The dynamic content controller comprises an analytics engine and a personalization engine coupled to the analytics engine. The analytics engine is configured to analyze cultural data collected from the one or more data sources during a current content browsing session. The personalization engine is configured to adapt content to be presented based at least in part on the analysis of the cultural data. The adaptation of the content to be presented is performed during the current content browsing session.

20 Claims, 8 Drawing Sheets

(56) References Cited

OTHER PUBLICATIONS

Ruud Verheijden, "Predicting Purchasing Behavior Throughout the Clickstream," Eindhoven University of Technology, Identity No. 0609445, Nov. 2012, 32 pages.
Michael H. Hoppe, "Culture and Leader Effectiveness: The GLOBE Study," Sep. 2007, 6 pages.
globalizationpartners.com, "Creating Culturally Customized Content for Website Translation," Translation Blog,, http://blog.globalizationpartners.com/culturally-customized-website.aspx, Aug. 2011, 6 pages.
A. Marcus et al., "Crosscurrents: Cultural Dimensions and Global Web User-Interface Design," Interactions, Jul./Aug. 2000, pp. 32-46, vol. 7, No. 4.
Wikipedia, "Hofstede's Cultural Dimensions Theory," http://en.wikipedia.org/w/index.php?title=Hofstede%27s_cultural_dimensions_theory&printable=yes, Nov. 2014, 14 pages.
A. Marcus et al., "Cultural Dimensions and Global Web UI Design: What? So What? Now What?" Aaron Marcus and Associates, Inc., AM+A, Jun. 2000, 27 pages.

\* cited by examiner

FIG. 5

| NATIONAL CULTURE DIMENSIONS | DEFINITION | SOCIETAL VIEW EXAMPLES |
|---|---|---|
| 510 — POWER DISTANCE (PDI) | THIS DIMENSION EXPRESSES THE DEGREE TO WHICH THE LESS POWERFUL MEMBERS OF A SOCIETY ACCEPT AND EXPECT THAT POWER IS DISTRIBUTED UNEQUALLY. | PEOPLE IN SOCIETIES EXHIBITING A LARGE DEGREE OF POWER DISTANCE ACCEPT A HIERARCHICAL ORDER IN WHICH EVERYBODY HAS A PLACE AND WHICH NEEDS NO FURTHER JUSTIFICATION. IN SOCIETIES WITH LOWER POWER DISTANCE, PEOPLE STRIVE TO EQUALIZE THE DISTRIBUTION OF POWER AND DEMAND JUSTIFICATION FOR INEQUALITIES OF POWER. |
| 512 — INDIVIDUALISM (IDV) VERSUS COLLECTIVISM | INDIVIDUALISM IS PREFERENCE FOR A LOOSELY-KNIT SOCIAL FRAMEWORK IN WHICH INDIVIDUALS ARE EXPECTED TO TAKE CARE OF ONLY THEMSELVES AND THEIR IMMEDIATE FAMILIES.<br><br>COLLECTIVISM REPRESENTS A PREFERENCE FOR A TIGHTLY-KNIT FRAMEWORK IN SOCIETY IN WHICH INDIVIDUALS CAN EXPECT THEIR RELATIVES OR MEMBERS OF A PARTICULAR IN-GROUP TO LOOK AFTER THEM IN EXCHANGE FOR UNQUESTIONING LOYALTY. | A SOCIETY'S POSITION ON THIS DIMENSION IS REFLECTED IN WHETHER PEOPLE'S SELF-IMAGE IS-DEFINED IN TERMS OF "I" OR "WE." |
| 514 — MASCULINITY VERSUS FEMININITY (MAS) | THE MASCULINITY SIDE OF THIS DIMENSION REPRESENTS A PREFERENCE IN SOCIETY FOR ACHIEVEMENT, HEROISM, ASSERTIVENESS AND MATERIAL REWARDS FOR SUCCESS.<br><br>FEMININITY, STANDS FOR A PREFERENCE FOR COOPERATION, MODESTY, CARING FOR THE WEAK AND QUALITY OF LIFE. | SOCIETY AT LARGE IS MORE CONSENSUS-ORIENTED. |

| | | |
|---|---|---|
| 516 — UNCERTAINTY AVOIDANCE (UAI) | UNCERTAINTY AVOIDANCE EXPRESSES THE DEGREE TO WHICH THE MEMBERS OF A SOCIETY FEEL UNCOMFORTABLE WITH UNCERTAINTY AND AMBIGUITY. | THE FUNDAMENTAL ISSUE HERE IS HOW A SOCIETY DEALS WITH THE FACT THAT THE FUTURE CAN NEVER BE KNOWN: SHOULD WE TRY TO CONTROL THE FUTURE OR JUST LET IT HAPPEN? COUNTRIES EXHIBITING STRONG UAI MAINTAIN RIGID CODES OF BELIEF AND BEHAVIOR AND ARE INTOLERANT OF UNORTHODOX BEHAVIOR AND IDEAS. WEAK UAI SOCIETIES MAINTAIN A MORE RELAXED ATTITUDE IN WHICH PRACTICE COUNTS MORE THAN PRINCIPLES. |
| 518 — LONG-TERM ORIENTATION (LTO) VERSUS SHORT-TERM ORIENTATION* | LONG-TERM ORIENTATION STANDS FOR THE FOSTERING OF VIRTUES ORIENTED TOWARD FUTURE REWARDS – IN PARTICULAR, PERSEVERANCE AND THRIFT.<br><br>SHORT-TERM ORIENTATION STANDS FOR THE TRADITION, PRESERVATION OF "FACE," AND FULFILLING SOCIAL OBLIGATION. | PERSISTENCE AND THRIFT REFLECT AN ORIENTATION TOWARDS THE FUTURE, WHEREAS PERSONAL STABILITY AND TRADITION CAN BE SEEN AS STATIC ORIENTATION TOWARDS THE PRESENT AND THE PAST. |

| | PDI | | IDV | | MAS | | UAI | | LTO | |
|---|---|---|---|---|---|---|---|---|---|---|
| | RANK | SCORE | RANK | SCORE | RANK | SCORE | RANK | SCORE | RANK | SCORE |
| ARAB COUNTRIES | 7 | 80 | 26/27 | 38 | 23 | 53 | 27 | 68 | | |
| ARGENTINA | 35/36 | 49 | 22/23 | 46 | 20/21 | 56 | 10/15 | 86 | | |
| AUSTRALIA | 41 | 36 | 2 | 90 | 16 | 61 | 37 | 51 | 15 | 31 |
| AUSTRIA | 53 | 11 | 18 | 55 | 2 | 79 | 24/25 | 70 | | |
| BANGLADESH | | | | | | | | | 11 | 40 |
| BELGIUM | 20 | 65 | 8 | 75 | 22 | 54 | 5/6 | 94 | | |
| BRAZIL | 14 | 69 | 26/27 | 38 | 27 | 49 | 21/22 | 76 | 6 | 65 |
| CANADA | 39 | 39 | 4/5 | 80 | 24 | 52 | 41/42 | 48 | 20 | 23 |
| CHILE | 24/25 | 63 | 38 | 23 | 46 | 28 | 10/15 | 86 | | |
| CHINA | | | | | | | | | 1 | 118 |
| COLUMBIA | 17 | 67 | 49 | 13 | 11/12 | 64 | 20 | 80 | | |
| COSTA RICA | 42/44 | 35 | 46 | 15 | 48/49 | 21 | 10/15 | 86 | | |
| DENMARK | 51 | 18 | 9 | 74 | 50 | 16 | 51 | 23 | | |
| EAST AFRICA | 21/23 | 64 | 33/35 | 27 | 39 | 41 | 36 | 52 | | |
| ECUADOR | 8/9 | 78 | 52 | 8 | 13/14 | 63 | 28 | 67 | | |
| FINLAND | 46 | 33 | 17 | 63 | 47 | 26 | 31/32 | 59 | | |
| FRANCE | 15/16 | 68 | 10/11 | 71 | 35/36 | 43 | 10/15 | 86 | | |
| GERMANY FR | 42/44 | 35 | 15 | 67 | 9/10 | 66 | 29 | 65 | 14 | 31 |
| GREAT BRITAIN | 42/44 | 35 | 3 | 89 | 9/10 | 66 | 47/48 | 35 | 18 | 25 |
| GREECE | 27/28 | 60 | 30 | 35 | 18/19 | 57 | 1 | 112 | | |
| GUATEMALA | 2/3 | 95 | 53 | 6 | 43 | 37 | 3 | 101 | | |
| HONG KONG | 15/16 | 68 | 37 | 25 | 18/19 | 57 | 49/50 | 29 | 2 | 96 |
| INDIA | 10/11 | 77 | 21 | 48 | 20/21 | 56 | 45 | 40 | 7 | 61 |
| INDONESIA | 8/9 | 78 | 47/48 | 14 | 30/31 | 46 | 41/42 | 48 | | |
| IRAN | 29/30 | 58 | 24 | 41 | 35/36 | 43 | 31/32 | 59 | | |
| IRELAND (REPUBLIC OF) | 49 | 28 | 12 | 70 | 7/8 | 68 | 47/48 | 35 | | |
| ISRAEL | 52 | 13 | 19 | 54 | 29 | 47 | 19 | 81 | | |
| ITALY | 34 | 50 | 7 | 76 | 4/5 | 70 | 23 | 75 | | |
| JAMAICA | 37 | 45 | 25 | 39 | 7/8 | 68 | 52 | 13 | | |

| | | | | | | | | | | |
|---|---|---|---|---|---|---|---|---|---|---|
| JAPAN | 33 | 54 | 22/23 | 46 | 1 | 95 | 7 | 92 | 4 | 80 |
| MALAYSIA | 1 | 104 | 36 | 26 | 25/26 | 50 | 46 | 36 | | |
| MEXICO | 5/6 | 81 | 32 | 30 | 6 | 69 | 18 | 82 | | |
| NETHERLANDS | 40 | 58 | 4/5 | 80 | 51 | 14 | 35 | 53 | 10 | 44 |
| NEW ZEALAND | 50 | 22 | 6 | 79 | 17 | 58 | 39/40 | 49 | 16 | 30 |
| NIGERIA | | | | | | | | | 22 | 16 |
| NORWAY | 47/48 | 31 | 13 | 69 | 52 | 8 | 38 | 50 | | |
| PAKISTAN | 32 | 55 | 47/48 | 14 | 25/26 | 50 | 24/25 | 70 | 23 | 0 |
| PANAMA | 2/3 | 95 | 51 | 11 | 34 | 44 | 10/15 | 86 | | |
| PERU | 21/23 | 64 | 45 | 16 | 37/38 | 42 | 9 | 87 | | |
| PHILIPPINES | 4 | 94 | 31 | 32 | 11/12 | 64 | 44 | 44 | 21 | 19 |
| POLAND | | | | | | | | | 13 | 32 |
| PORTUGAL | 24/25 | 63 | 33/35 | 27 | 45 | 31 | 2 | 104 | | |
| SALVADOR | 18/19 | 66 | 42 | 19 | 40 | 40 | 5/6 | 94 | | |
| SINGAPORE | 13 | 74 | 39/41 | 20 | 28 | 48 | 53 | 8 | 9 | 48 |
| SOUTH AFRICA | 35/36 | 49 | 16 | 65 | 13/14 | 63 | 39/40 | 49 | | |
| SOUTH KOREA | 27/28 | 60 | 43 | 18 | 41 | 39 | 16/17 | 85 | 5 | 75 |
| SPAIN | 31 | 57 | 20 | 51 | 37/38 | 42 | 10/15 | 86 | | |
| SWEDEN | 47/48 | 31 | 10/11 | 71 | 53 | 5 | 49/50 | 29 | 12 | 33 |
| SWITZERLAND | 45 | 34 | 14 | 68 | 4/5 | 70 | 33 | 58 | | |
| TAIWAN | 29/30 | 58 | 44 | 17 | 32/33 | 45 | 26 | 69 | 3 | 87 |
| THAILAND | 21/23 | 64 | 39/41 | 20 | 44 | 34 | 30 | 64 | 8 | 56 |
| TURKEY | 18/19 | 66 | 28 | 37 | 32/3 | 45 | 16/17 | 85 | | |
| URUGUAY | 26 | 61 | 29 | 36 | 42 | 38 | 4 | 100 | | |
| USA | 38 | 40 | 1 | 91 | 15 | 62 | 43 | 46 | 17 | 29 |
| VENEZUELA | 5/6 | 81 | 50 | 12 | 3 | 73 | 21/22 | 76 | | |
| WEST AFRICA | 10/11 | 77 | 39/41 | 20 | 30/31 | 46 | 34 | 54 | | |
| YUGOSLAVIA | 12 | 76 | 33/35 | 27 | 48/49 | 21 | 8 | 88 | | |
| ZIMBABWE | | | | | | | | | 19 | 25 |

*FIG. 6 cont.*

DYNAMIC CONTENT CONTROL IN AN INFORMATION PROCESSING SYSTEM BASED ON CULTURAL CHARACTERISTICS

CROSS REFERENCE TO RELATED APPLICATION

The present application is a continuation-in-part of U.S. patent application identified as Ser. No. 14/225,959, filed on Mar. 26, 2014, entitled "Dynamic Content Control in an Information Processing System," the disclosure of which is incorporated by reference herein in its entirety.

FIELD

The field relates generally to information processing systems, and more particularly to dynamic content control based on cultural characteristics in such systems.

BACKGROUND

As is known, a website (or simply, site) is typically comprised of a set of related web pages (content) served from a web domain hosted on at least one web server. The web server is accessible via a communication network such as the Internet or a private local area network through an Internet address. Websites have become a predominant way for a company to offer and sell its products. Today, the content rendered on most company websites tends to be relatively static. As a result, such static websites fail to take into account important facts about a visitor that could greatly affect the success or failure of a site visit.

SUMMARY

Illustrative embodiments of the present invention provide analytic techniques for dynamic content control based on cultural characteristics. In the context of a website, for example, such analytic techniques permit, in real-time or near real-time, site visitor segmentation, product recommendations, and/or advertisement placement functionality during content presentation on a website based on cultural characteristics of the visitor.

In one embodiment, a dynamic content controller is configured for communication with one or more data sources. The dynamic content controller comprises an analytics engine and a personalization engine coupled to the analytics engine. The analytics engine is configured to analyze cultural data collected from the one or more data sources during a current content browsing session. The personalization engine is configured to adapt content to be presented based at least in part on the analysis of the cultural data. The adaptation of the content to be presented is performed during the current content browsing session, thus making the adaptation real-time or near real-time.

Other embodiments include without limitation methods, apparatus, systems, and articles of manufacture comprising processor-readable storage media.

BRIEF DESCRIPTION OF THE DRAWINGS

FIG. 5 is a table describing a set of dimensions of culture used in a dynamic content control stack according to an illustrative embodiment.

FIG. 6 is a table of country ranks and scores for the set of dimensions of culture in FIG. 5.

DETAILED DESCRIPTION

Figure 1:
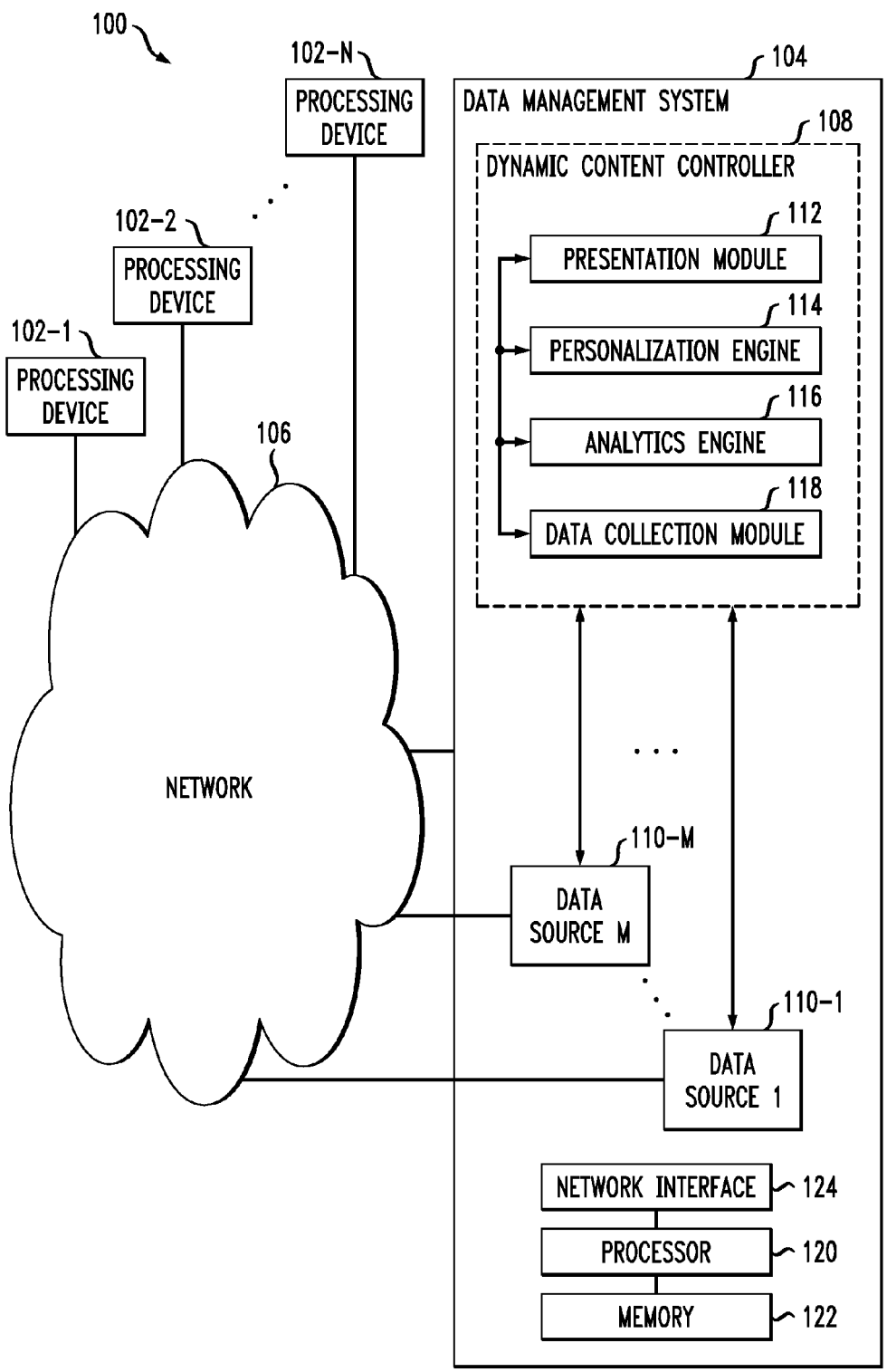
FIG. 1 is a block diagram of an information processing system comprising a data management system with analytic techniques for dynamic content control in an illustrative embodiment of the invention.

Illustrative embodiments of the invention will be described herein with reference to exemplary information processing systems and associated dynamic content controllers implemented using one or more processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination. The term "dynamic content controller" is also intended to be broadly construed so as to encompass a variety of different arrangements for performing analytics on data sources to generate in real-time/near real-time personalized content for presentation.

As used herein, the term "in-memory" refers to "main memory" such as, for example, an in-memory database (i.e., main memory database system or memory resident database) which is a database management system that primarily relies on main memory for computer data storage. It is contrasted with database management systems that employ a disk storage mechanism. Main memory databases are faster than disk-optimized databases since the internal optimization algorithms are simpler and disk input/output (I/O) occurs substantially less often. Accessing data in memory eliminates seek time when querying the data, which provides faster and more predictable performance than disk. In applications where response time is critical, such as telecommunications network equipment and mobile advertising networks, main memory databases are often used. Furthermore, data analytics taking place in main memory (in-memory) can be performed much faster than when the analytics require retrieving and interacting with data on disk. Examples of the in-memory databases that can be employed in accordance with illustrative embodiments of the invention include, but are not limited to, Pivotal GemFire™, Pivotal GemFire XD™, or Apache Spark™.

The term "disaggregated," as used herein, refers to data that, at least substantially, has not been summarized and/or combined. Aggregated data is generally thought of in terms of sums and combinations of attributes into groups. For instance, often someone who analyzes web traffic will look at high level, summary counts of site visitors. This tells the web analyst only very high-level information, such as whether their web traffic is increasing, decreasing, or the same. Otherwise, it tells them very little. By contrast, disaggregated data refers to data that has not been summarized and/or combined. Disaggregated data is the low-level detailed, original, raw data that describes individual user-level behavior on the site including, but not limited to, clickstream data, Internet Protocol (IP) addresses, packet data headers, cultural data, and other information that is available at a granular level and can be used as an input to more sophisticated analytics (e.g., collaborative filtering, time series and autoregressive integrated moving average (ARIMA) analyses, clustering techniques and others).

Further, as used herein, the term "dynamic" refers to a content control functionality using a dynamic content controller according to one or more embodiments of the invention that provides, for example, customized content, ads, and user experience based on the user and site visit in real-time or at least near real-time. As a visitor continues to browse the site, the customized recommendation will get refined, thus improving the overall site experience for the site visitor. As mentioned above, many sites are static today. That is, regardless of who you are or what you are looking for, you are offered the same prices, the same products, and shown the same ads if you visit a static website. This is a very suboptimal experience, and provides a very generic and low-value user experience. It is realized here that this low-value user experience with static websites is even further exacerbated when such websites fail to take into account cultural data and related attributes or characteristics of the website visitors.

Embodiments of the invention overcome these and other drawbacks associated with static websites. Converging technology advances in storage (such as, for example, scale-out network attached storage or NAS), compute resources (for example, high performance computing) and applications (such as, for example, Hadoop™, massively parallel processing (MPP), and in-memory data stores such as, for example, Pivotal GemFire™ and others mentioned above) can be leveraged making it now feasible to store, analyze and use behavioral characteristics to classify website visitors and serve them dynamically rendered content in real-time/near real-time according to embodiments of the invention. Fine-grain data collected in the form of digital fingerprinting and location services coupled with indicators of cultural predilections enables the creation of websites that can be dynamically customized to various audiences and cultural contexts. As a result, embodiments of the invention allow individuals from different geographies and cultures to have a favorable experience on a given website, while enabling the companies hosting the website to receive more web traffic and a better user experience.

In a U.S. patent application identified as Ser. No. 14/225,959, filed on Mar. 26, 2014, entitled "Dynamic Content Control in an Information Processing System," the disclosure of which is incorporated by reference herein in its entirety, mechanisms are described that provide a technology stack capable of sensing information about website visitors and performing of analytical operations based on the behavioral characteristics of the site visitors. Embodiments of the invention described herein provide website customization using cultural sensors including sensing cultural characteristics, translating these characteristics into a data taxonomy, a set of ontologies, a set of heuristics, or some other type of classification system, and using this data to classify website visitors and render appropriate content in real-time or near-real time. In the context of this application, the term "sensors" refers to, for example, indicators, markers, and/or signals relating to attributes that may reflect a cultural designation. In one or more illustrative embodiments, such dynamic content control techniques based on cultural characteristics may be implemented using at least portions of the technology stack described in the above-referenced Ser. No. 14/225,959 application. However, it is to be appreciated that such dynamic content control techniques based on cultural characteristics described herein may be implemented on platforms that vary from those described in the above-referenced Ser. No. 14/225,959 application.

Figure 2:
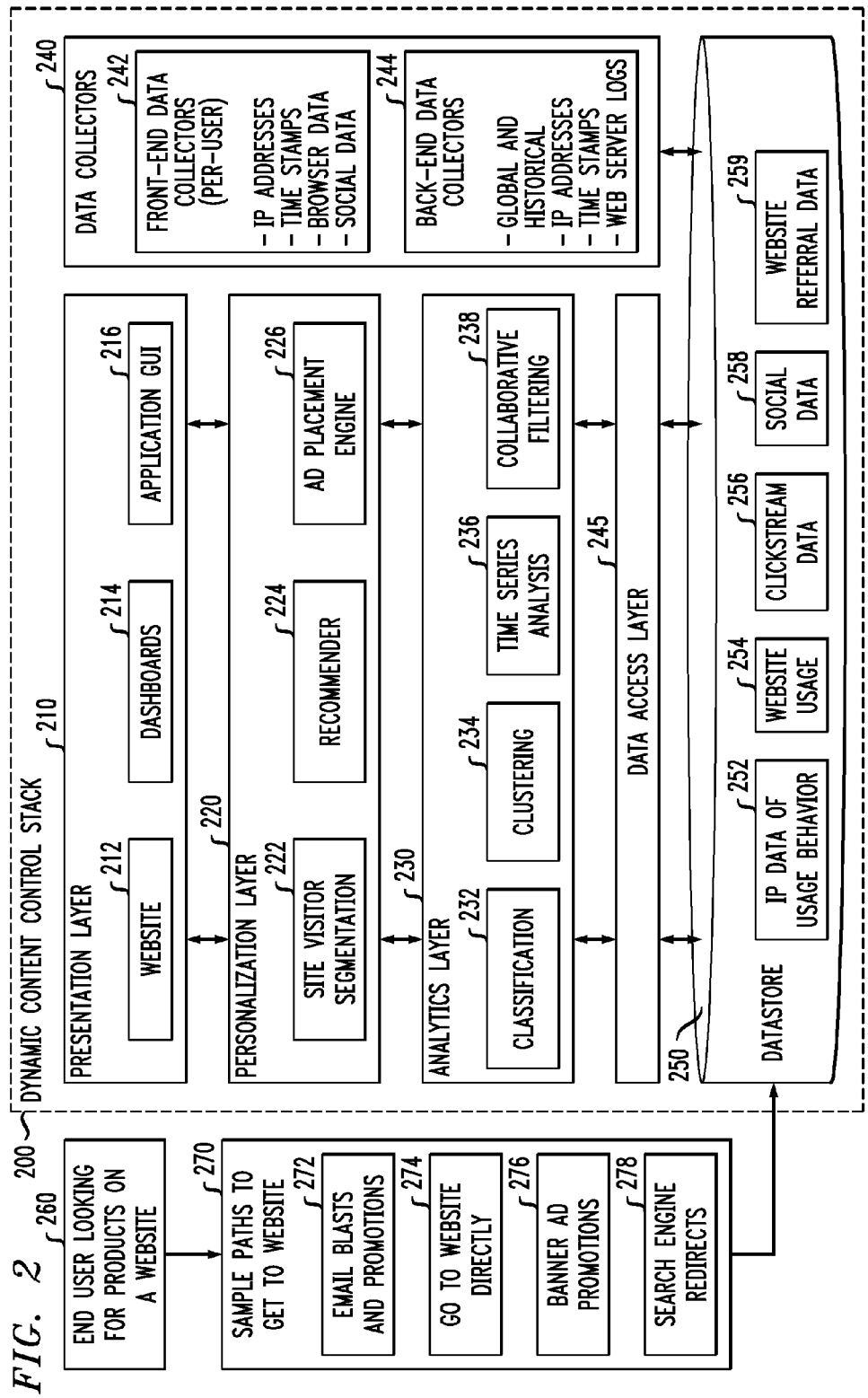
FIG. 2 is a block diagram of a dynamic content control stack implemented in the information processing system of FIG. 1.
Figure 3:
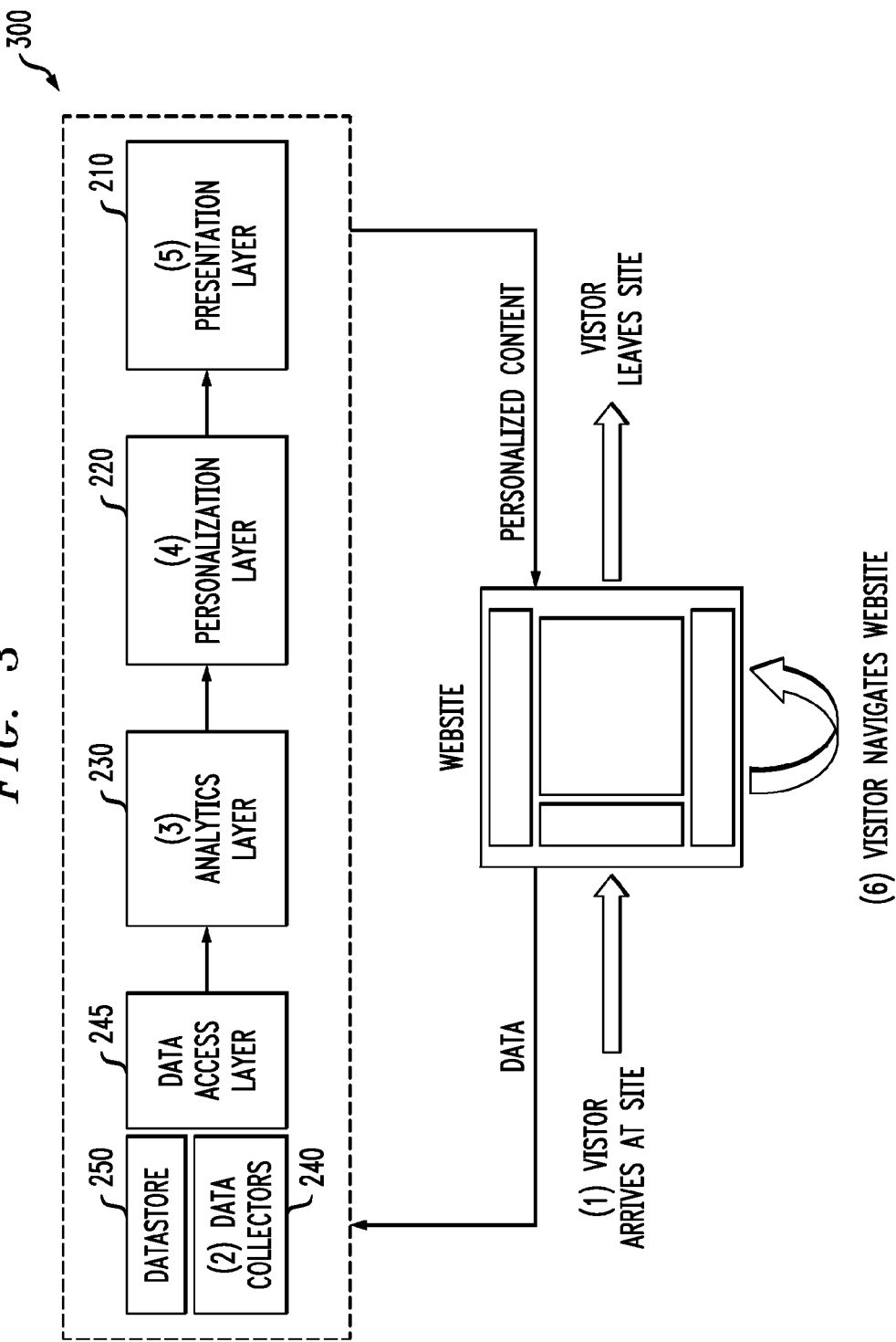
FIG. 3 is a flow diagram of an exemplary workflow of a dynamic content control stack of FIG. 2.
Figure 4:
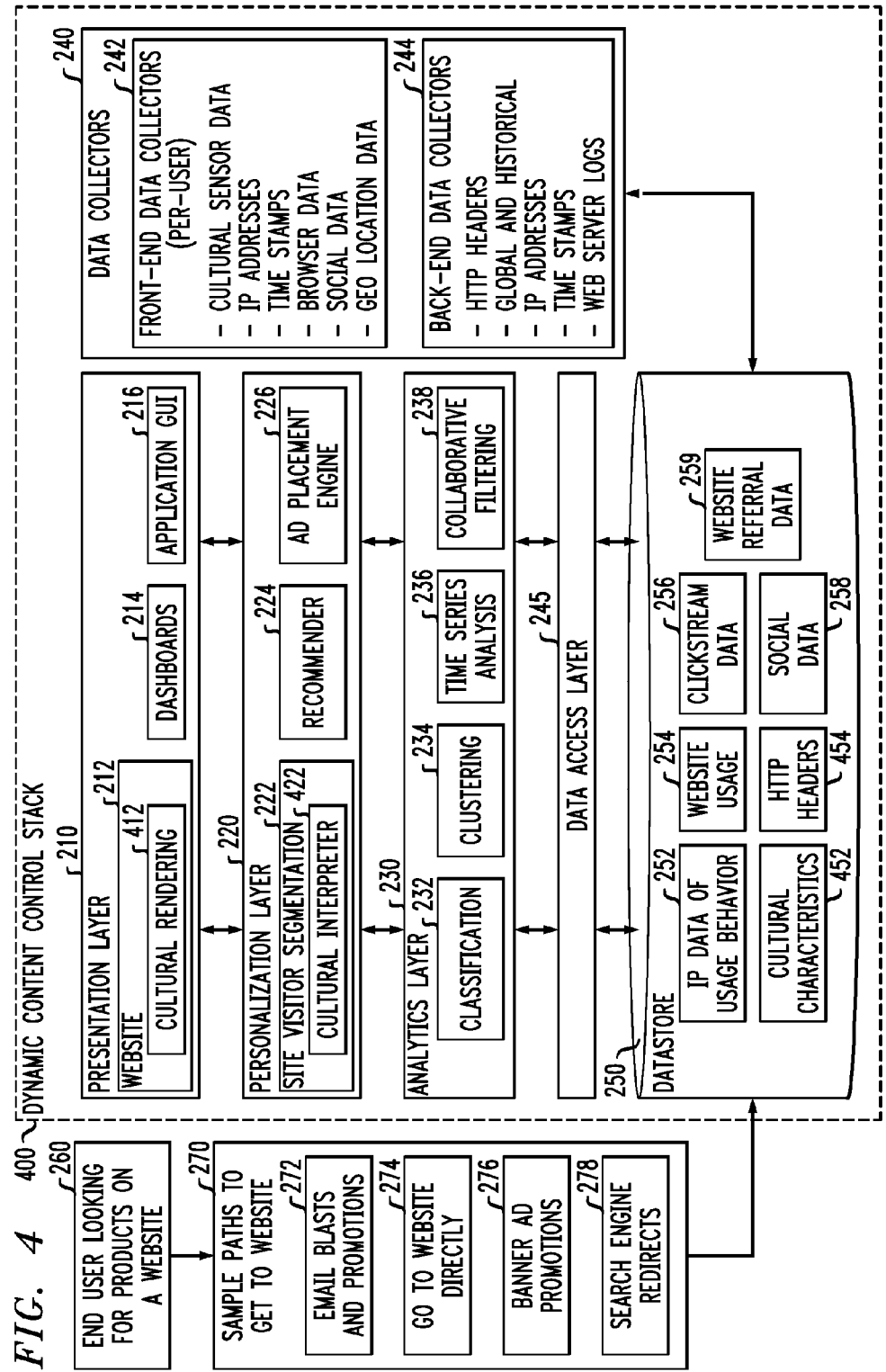
FIG. 4 is a block diagram of a dynamic content control stack implemented in the information processing system of FIG. 1 with cultural sensor-responsive website customization according to an illustrative embodiment.

We first describe a dynamic content controller, generally, that uses disaggregated data to adapt and otherwise generate content in the context of FIGS. 1-3, and then we describe a dynamic content controller that provides content generation and adaptation based on cultural characteristics of the content recipients in the context of FIGS. 4-6.

FIG. 1 shows an information processing system 100 configured in accordance with an illustrative embodiment of the invention. The information processing system 100 comprises a plurality of processing devices 102-1, 102-2, . . . 102-N and a data management system 104 that communicate with one another over a network 106. The data management system 104 comprises a dynamic content controller 108 and a plurality of data sources 110-1, 110-2, . . . 110-M coupled to the dynamic content controller 108. The dynamic content controller 108 comprises a presentation module 112, a personalization engine 114, an analytics engine 116, and a data collection module 118, operatively coupled to one another. While all of these components can operate in conjunction with main memory (in-memory), at least personalization engine 114 and analytics engine 116 preferably operate as such.

These components of the dynamic data controller 108 (i.e., presentation module 112, personalization engine 114, analytics engine 116, and data collection module 118) are configured to autonomously recommend personalized and most-relevant information to a website visitor based on current user behaviors, as well as past user behaviors, as will be explained in further detail below in the context of FIGS. 2 and 3. A detailed description of how information processing system 100 is adapted to provide dynamic content control based on cultural characteristics will be provided below in the context of FIG. 4.

The personalization and recommendation (made in accordance with personalization engine 114) is accomplished in real-time, or near real-time, such that a website visitor is able to experience the dynamic content in a current browsing session. Thus, embodiments of the invention make it feasible to store, analyze and use behavioral characteristics (and cultural characteristics as will be further explained below in the context of FIG. 4) to classify website visitors (in accordance with analytics engine 116) and serve them dynamically rendered content (in accordance with presentation module 112) in real-time or near real-time. By employing such a comprehensive in-memory dynamic content solution, content on a website becomes more "predictive" in nature.

The data sources 110 (110-1, 110-2, . . . 110-M) illustratively store multiple types of raw data (i.e., disaggregated data) associated with one or more website visitor's behavior. For example, such raw data stored in data sources 110 includes, but is not limited to, IP data of usage behavior, website usage data, clickstream data, social media data, and website referral data. A given type of raw data can be stored in a specific one of the data sources or across more than one of the data sources. Data collection module 118 collects the raw data stored in data sources 110, as will be further explained below.

Although the data sources 110 are shown in the FIG. 1 embodiment as being implemented within the data management system 104, in other embodiments at least a subset of the data sources 110 may be implemented at least in part externally to the data management system 104. For example, it is possible to implement a given data source using one or more of the processing devices 102 external to the data management system 104. A given "data source" as that term is broadly used herein may itself comprise or be part of, for example, a database management system (DBMS) or other type of data set management system, data repository or, more generally, data management system.

One or more of the components of dynamic content controller 108 may be implemented using respective portions of an analytic data store or other arrangements of one or more data stores. Such data stores may additionally encompass at least portions of the data sources 110. A given analytic data store utilized in one or more embodiments of the invention may be implemented at least in part utilizing a Pivotal Greenplum® database. Other examples of data stores that may be used in embodiments of the invention include low-latency data stores such as Pivotal GemFire™ and Pivotal GemFire XD™.

However, these are just examples of possible data store implementations, and numerous other data management products may be used to implement the data management system 104, dynamic content controller 108, and data sources 110 in other embodiments. For example, possible alternatives to Pivotal Greenplum® database for implementing an analytic data store include Hadoop™ file system, Hive™, Teradata™, Couchbase™, Netezza™ and others, as will be readily appreciated by those skilled in the art.

Also, although shown as components of the dynamic content controller 108 within data management system 104 in the FIG. 1 embodiment, at least portions of the presentation module 112, the personalization engine 114, the analytics engine 116, and the data collection module 118 may be implemented externally to the dynamic content controller 108 or data management system 104 in other embodiments.

The data management system 104 in the illustrative embodiment shown in FIG. 1 further comprises a processor 120, a memory 122 and a network interface 124. These are assumed to be elements of at least one processing device. The data management system 104 is therefore implemented in the FIG. 1 embodiment using at least one processing device comprising a processor coupled to a memory.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The network interface 124 comprises network interface circuitry that allows the data management system 104 to communicate over the network 106 with the other processing devices 102 of the information processing system 100. Such network interface circuitry may comprise, for example, one or more conventional transceivers.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

At least a portion of the dynamic content controller 108 may comprise software that is stored in memory 122 and executed by processor 120.

Each of the processing devices 102 may similarly incorporate processor, memory and network interface elements of the type described above.

The data management system 104 and the processing devices 102 may comprise a common processing platform or multiple separate processing platforms. Such processing platforms can include virtual machines implemented using one or more hypervisors running on underlying physical infrastructure. Although shown as separate from the processing devices 102 in the present embodiment, the data management system 104 may be implemented at least in part using one or more such processing devices.

It should be understood that the particular sets of modules, engines and other components implemented in the information processing system 100 as illustrated in FIG. 1 are presented by way of example only. In other embodiments, only subsets of these components, or additional or alternative sets of components, may be used, and such components may exhibit alternative functionality and configurations.

Furthermore, it should be understood that one or more of the processing devices 102 can comprise one or more client devices through which one or more website users visit (site visitors) a given website hosted by one or more other ones of the processing devices 102 acting as servers. Alternatively, part of or all of the subject website can be hosted by the data management system 104.

The operation of the system 100 will now be described in greater detail with reference to FIGS. 2 and 3, which illustrates an exemplary dynamic content control stack implemented by the dynamic content controller 108 of the data management system 104 in one embodiment. A description of the operation of FIG. 1 using cultural characteristics to perform dynamic content control will be described below in the context of FIG. 4.

The dynamic content control stack offers the capability for an information processing system to autonomously recommend personalized and most relevant information to website visitors based on their current and past behaviors. As shown, a dynamic content control stack 200 comprises a presentation layer 210, on top of a personalization layer 220, on top of an analytics layer 230, on top of a data access layer 245, on top of a datastore 250 coupled to data collectors 240.

The presentation layer 210 corresponds to presentation module 112 in the dynamic content controller 108 of FIG. 1. That is, in this illustrative embodiment, presentation module 112 is configured to implement presentation layer 210 and each of its functionalities described herein. As shown in FIG. 2, presentation layer 210 comprises a website portal 212, dashboards 214, and an application graphical user interface (GUI) 216. The presentation layer 210 is the highest-level layer of the control stack 200. The website portal 212 is configured to provide the personalized experience for site visitors. Dashboards 214 are configured to provide a tool for data analysts to monitor aggregated and disaggregated data on how visitors interact with the website portal 212. Application GUI 216 is configured to allow data analysts to build and customize additional GUI applications such as, but not limited to, data visualization of various data models which offer insights to stakeholders on how to improve their business and increase return on investment.

The personalization layer 220 corresponds to personalization engine 114 in the dynamic content controller 108 of FIG. 1. That is, in this illustrative embodiment, personalization engine 114 is configured to implement personalization layer 220 and each of its functionalities described herein. With the insights produced by the analytics layer 230, as will be further explained below, the personalization layer 220 provides multiple ways to personalize and enhance a visitors overall experience of the website. In illustrative embodiments, with the use of in-memory databases, Hadoop™ ecosystem tools, and massively parallel processing (MPP) databases, such website content personalization can be done in real-time or near real-time. As shown in FIG. 2, personalization layer 220 comprises site visitor segmentation functionality 222, a recommender 224, and an advertisement placement engine 226.

Site visitor segmentation 222 functions as follows. With the analytics techniques deployed in the analytics layer 230 such as, for example, clustering, the dynamic content controller is configured to segment the visitors based on website usage. Segmentation comprises identifying an individual who is conducting the current content browsing session as one of: a directed buying user; a search and deliberation user; a casual browsing user; or a knowledge building user. The dynamic content controller can then adjust recommendations and personalization of the website accordingly.

The recommender 224 is based on the visitor segmentation and techniques deployed in the analytics layer 230 such as, for example, collaborative filtering. A main goal of the recommender 224 is to make intelligent choices as to which product offerings to recommend to a visitor according to the visitor's interests.

The advertisement placement engine 226 is configured to display relevant promotions and products that would most likely attract the visitor based on the visitor's interests.

The analytics layer 230 corresponds to analytics engine 116 in the dynamic content controller 108 of FIG. 1. That is, in this illustrative embodiment, analytics engine 116 is configured to implement analytics layer 230 and each of its functionalities described herein. The analytics layer 230 is configured to deploy data mining techniques to extract insights on topics in which a visitor is interested, and relevant offerings that can be provided. In illustrative embodiments, the analytics layer 230 can apply, by way of example only, a library of machine-learning algorithms such as MADLib™ with a PostgreSQL™ database or a library of machine-learning algorithms such as Mahout™ with a Hadoop™ ecosystem to enable a scalable solution for real-time analyses.

As shown in FIG. 2, analytics layer 230 comprises classification functionality 232, clustering functionality 234, time series analysis functionality 236, and collaborative filtering functionality 238.

Classification 232 refers to the statistical process of identifying to which of a set of categories a new observation belongs on the basis of a training set of data. A few well-known classifiers that can be used by module 232 include, but are not limited to, regression, decision tree, naïve Bayes, random forest and support vector machine. The classification module is configured to deploy multiple classifiers to categorize product offerings and visitors and identify the likelihood of a visitor buying a product.

The clustering module 234 is configured to group visitors and product offerings based on their similarities. This grouping function assists the site visitor segmentation 222 for downstream personalization.

Time series analysis 236 can be used on temporal data and provides short-term predictions such as the future website traffic, how many more products are likely to be offered the next month, and the expected sales of the next month.

Collaborative filtering 238 is used by the recommendation engine 224. With the current visitor, collaborative filtering looks at historically what products similar visitors ended up purchasing or showed interest in, and therefore the module 238 recommends those products to the current visitor.

Data collectors 240 correspond to data collection module 118 in the dynamic content controller 108 of FIG. 1. That is, in this illustrative embodiment, data collection module 118 is configured to implement data collectors 240 and each of the data collection functionalities described herein. As shown in FIG. 2, data collectors 240 comprise front-end data collectors 242 (client side) and back-end data collectors 244 (web server side) which respectively collect front-end data and back-end data and feed the datastore 250.

The front-end data collectors 242 run locally on the client side throughout the entire browser session. For each visitor (per user), the front-end data collectors record data such as, by way of example, the IP address, browser environment (including cookies), time stamps, username, what links on the current website the user clicked, and the data collected from the user's social network.

The back-end data collectors 244 collect global and historical server logs including all uniform resource locators (URLs) that have been accessed by a specific IP address at the given timestamps.

The data access layer (DAL) 245 provides data connectors to the datastore 250 for the analytics layer 230 to conduct data analyses. DAL 245 in computer software is a layer of a computer program which provides simplified access to data stored in persistent storage of some kind, such as an entity-relational database. The DAL 245 can return a reference to an object with attributes rather than rows of fields from a database table. An Open Database Connectivity (ODBC) connector can be used to provide the mechanism for the system to connect to any database via the ODBC driver. Then, the system can easily read and write data in the form of objects which are translated by the ODBC connector. ODBC is not necessarily part of the DAL 245. DAL 245 is at a higher level of the data connectors.

The datastore 250 is the data repository of all the data acquired and consumed by the control stack 200 (i.e., by the dynamic content controller 108). The boxes in datastore 250 highlight the five exemplary types of raw (disaggregated) data being stored. At the implementation level, the datastore 250 can be a data warehouse, a Massively Parallel Processing (MPP) database, a NoSQL datastore (such as HBase™) or a mix of several kinds of datastores. In-memory databases such as Pivotal GemFire™ or Pivotal GemFire XD™ can be used as the datastore to enable real-time or near real-time analyses.

IP data of usage behavior 252 refers to the IP addresses of where the visitors come from, which can benefit analyses of geographical locations or provide geo-enabled recommendation and personalization.

Website usage data 254 includes the records of how visitors interact with the website, such as the keywords being entered to search for an offering, the time being spend on each website, the links being clicked on, positions of the links being clicked on, the topics being browsed and if the visitor has linked his/her account with his/her social network accounts (such as Facebook™, Twitter™ and Google+™). If the user has registered, data 254 would also include the account name, previous orders and other historical records.

Clickstream data 256 includes the server log and the timestamps, IP addresses, user accounts and the documents the visitors have browsed.

If the users opt-in to associate their social network accounts (through the Facebook™, Twitter™ or Google™ application programming interface), their social network account, email, interests and other personal information can be saved as social data 258. For example, association of a social network account with the current website the user is visiting may be accomplished as follows. A website may be configured to allow users to login to, for example, their Facebook™, Twitter™ or Google™ account. When this is done, data associated with the social network account of the site visitor can be collected and stored as social data 258.

Website referral data 259 is built on top of the HTTP_REFERER. The HTTP_REFERER is part of the WWW standard and it records full URLs of the website's visitors before they access the current website. If the previous site is a search engine, the full URL recorded by the HTTP_REFERER would include the search keywords being used. HTTP refers to the Hypertext Transfer Protocol.

Blocks 260 and 270 illustrate an exemplary usage scenario.

Assume in step 260, a user is looking for a specific product online. Quite often a visitor lands on a webpage (or a group of similar webpages) with specific intentions. For example, if a visitor is looking at different brands of diapers on Amazon, this shows that the user is interested in diapers and might plan to buy diapers. If a visitor is comparing specifications of storage products such as VNX™, VPLEX™ and Isilon™, this shows that the user is interested in storage and might plan to buy a storage product. On the other hand, if the user is just browsing the "about us" and "overview" pages of the website, it is likely the user is just researching the company and may be less likely to make a purchase right away. If such subtle patterns are captured and analyzed by dynamic content controller 108, this offers valuable insights for marketing to perform up-sells, down-sells and cross-sells.

To illustrate the design, the following example will use an education website for the EMC Corporation (assignee of the present application) as an example. Generally, a visitor comes to the EMC education website because the visitor is looking for a specific offering such as a training course on Storage, Cloud or Big Data. If such an interest can be determined at the early stage of a browser session, it would help the system determine the most suitable offerings and thus greatly improve the overall site experience.

Block 270 includes a few sample paths that may lead a visitor to the EMC education website:

Email blasts and promotions 272: A visitor may land on the EMC education website by clicking in a promotion email which was part of an email blast. For example, the visitor may have clicked in an email promotion titled "Data Science Training Limited-Time Offer" and the URL the visitor clicked in the email contains an identifier to distinguish the original email content thus indicating an interest on Data Science related offerings. That is, when analyzing the incoming web traffic, the EMC website administrator cannot directly track the original email title that the visitor was viewing, but he can track the identifiers as part of an URL thus tracing down the original email where the visitor has clicked the URL.

Go to website directly 274: A visitor may come to the EMC education website by typing the URL directly or through clicking a few links on the EMC.com homepage.

Banner ad promotions 276: A visitor may come to the EMC education website by clicking an advertisement banner (such as Google™ Ads) on a third-party website. Similar to path 272, this may provide valuable insight on what topics the visitor is interested in.

Search engine redirects 278: Alternatively, a visitor may come to the EMC education website through search engine redirects. Redirects from major search engines generally include the search keywords the visitor used. The search keywords can be incorporated to determine interests of the visitor.

FIG. 3 is a flow diagram of an exemplary workflow 300 of the dynamic content control stack 200 of FIG. 2.

In step 1, a visitor arrives at the subject website and begins a current browsing session.

In step 2, data, not limited to login credentials, URL, and IP address, is captured. The data collectors 240 restructure the recent data and merge it with any other related data from the datastore 250. The relevant data is made available to the analytics layer 230 through the data access layer 245.

In step 3, the analytics layer 230 draws insights from the data provided in step 2. The insights may include, but are not limited to, the classification of the current visitor, the determination of additional items that the visitor may be interested in considering, and/or the probability of the visitor making a purchase.

In step 4, the personalization layer 220, using the insights from the analytics layer 230, determines the appropriate content to be displayed. The content may include, but is not limited to, promotions, discounts, and items that similar visitors found useful. Further personalization can be provided based on prior purchases, prior site visits, and the currently assigned customer segment. Furthermore, this personalization layer 220 can be used to run any A-B testing experiments to determine if promotions are cost-effective or what is the appropriate level of discount to offer.

In step 5, the presentation layer 210 organizes the content identified in the personalization layer 220 and builds the customized view to be presented to the visitor. This step constructs the view that the visitor will see on the website.

In step 6, the visitor navigates the website. Depending on the website, the visitor may see personalized news, weather, video, or other content. Also, targeted advertisements or product recommendations can be presented. As more data is generated from the visitor's actions on the website, steps 2 through 5 are repeated. Additional collected data may include items viewed, items added to cart, time stamps, and recommended items considered or ignored. This additional data is used to further personalize the visitors experience until the visitor leaves the site thus ending the current browsing session.

FIG. 4 is a block diagram of a dynamic content control stack implemented in the information processing system of FIG. 1 with cultural sensor-responsive website customization according to an illustrative embodiment. Note that in the embodiment illustrated in FIG. 4, dynamic content control stack 400 implements the same or similar components and modules as described above for dynamic content control stack 200 (FIG. 2). In such case, for the control stack 400, reference numerals are repeated from stack 200 with adaptations identified by new reference numerals.

The dynamic content control stack 400 offers the capability for an information processing system to autonomously recommend personalized and most relevant information to website visitors based on cultural characteristics of the visitors. As shown, a dynamic content control stack 400 (similar to control stack 200) comprises a presentation layer 210, on top of a personalization layer 220, on top of an analytics layer 230, on top of a data access layer 245, on top of a datastore 250 coupled to data collectors 240.

Note that, as shown in FIG. 4, the data collectors 240 (in particular, the front-end data collectors 242) additionally collect cultural sensor data and geographic location data from each site visitor, which will be further explained below. Furthermore, the data collectors 240 (in particular, the back-end data collectors 244) collect HTTP headers from packet data generated during each site visitor's access and/or usage of the website. Accordingly, in addition to the above-mentioned types of disaggregated data stored in the datastore 250, cultural characteristic data 452 and HTTP headers 454 are also part of the disaggregated data stored in datastore 250. It is to be appreciated that cultural characteristic data 452 may comprise raw data collected by the data collectors 240 such as cultural sensor data mentioned above, as well as data derived from cultural sensor data.

Furthermore, note that the site visitor segmentation component 222 further comprises a cultural interpreter 422. In conjunction with the analytics techniques deployed in the analytics layer 230 such as, for example, classifying and clustering as explained above, the dynamic content controller is configured to segment the visitors based on cultural characteristics 452 and HTTP headers 454. Segmentation here comprises identifying an individual who is conducting the current content browsing session (site visitor) as one who likely shares preferences attributable to a particular culture identified from a plurality of cultures. The dynamic content controller can then adjust recommendations and personalization of the website accordingly. Note that the website portal 212 is where cultural rendering 412 is implemented. This is the actual content that is presented to the site visitor which takes into account one or more cultural characteristics collected and analyzed for that particular site visitor. It is to be appreciated that such dynamic content control based on cultural characteristics allows for website content to be modified in real time, or at least near real-time, such that the website does not have to be initially designed to anticipate cultural preferences of potential site visitors. That is, the dynamic content control based on cultural characteristics according to embodiments of the invention allows for classifying a site visitor using cultural data translated into a classification system such as a taxonomy, a set of ontologies or a set of heuristics, and rendering appropriate content in real-time or near real-time. In one embodiment, such taxonomy or set of ontologies/heuristics of cultural characteristics may be determined using a multidimensional culture table and scales (ranks and scores) as developed by Geert Hofstede and described in G. Hofstede et al., "Cultures and Organizations: Software of the Mind," McGraw Hill Companies (2010), the disclosure of which is incorporated by reference herein in its entirety. Such taxonomy developed from the Hofstede dimensions of culture will be further described below in the context of FIGS. 5 and 6. However, it is to be appreciated that alternative cultural metrics may be employed other than, or in combination with, the Hofstede metrics. By way of example only, another classification system that may be used in the cultural interpreter as part of the classification and segmentation processes is described as part of the Global Leadership and Organizational Behavior Effectiveness (GLOBE) study in M. H. Hoppe "Culture and Leader Effectiveness: The GLOBE Study" (2007), the disclosure of which is incorporated by reference herein in its entirety.

Within the context of the description provided above, a detailed explanation of the approach is as follows.

Assume that end users are looking for EMC education products and come to the EMC education services website from email blasts/promotions, search engines results, EMC-.com, or banner ad promotions (as illustrated above in blocks 260 and 270 in FIG. 2). Within this series of events, the dynamic content controller (108 using control stack 400) examines and records initial sensors of culture, such as the language (e.g., English, Chinese, etc.) used in the email blast, the "From" field of the email (e.g., EMC headquarters, or EMC China, etc.), and the search engine being used (e.g., Google.com, google.co.jp, baidu.com, etc.). This cultural sensor data thus represents indicators, markers, and/or signals relating to attributes that may reflect a cultural designation of the site visitor. These sensors together with built-in web server logs (part of the back-end data collectors) collect IP addresses, timestamps, and clickstreams of each visit.

Additional, HTTP request headers can be recorded by the web server and if being utilized, they can provide valuable insights about the site visitors to the analytics layer 230 and cultural interpreter 422. By way of example only, the Accept-Language header field lists the acceptable human languages for response, the X-Forwarded-For header field identifies the originating IP address of a client connecting to a web server through an HTTP proxy or load balancer, and the HTTP REFERER header field records the previous webpage a visitor landed on.

Further, the geographic location of a web user can be collected as cultural sensor data. For example, a geographic reverse lookup function applied to the IP address may indicate which geographic region the user is from. The HTML5 Geolocation application programming interface shows where the user is and can accurately depict location on devices with a global positioning system such as current smartphones (e.g., Apple iPhone™).

The manner in which the user interacts with the website can also be collected as cultural sensor data. For example, the site visitor may be actively searching for instructor led courses offered in a specific region. When prompted with a list of countries/regions, the data collectors of the dynamic content controller can record which country/region the user chooses. Further, the natural language used for searching can be collected, and likewise, the natural language the browsed course description uses can be similarly recorded.

Still further, cultural sensor data that may be collected includes which countries/regions the majority of the site visitor's social network friends come from. This kind of data can be a good indicator of the current site visitor's cultural background.

Although IP addresses can be used as the identifier of site visitors, the existence of firewalls and proxies make IP addresses less reliable and valuable. To improve how site visitors are identified, social features can be enabled or embedded throughout the website to improve tracking and data integration. For example, using a mixture of social data (e.g., obtained via trackers, web beacons, cookies, or single sign-on logins), IP address data, and digital fingerprinting, the location of the site visitor and country of origin can be determined.

The country and location data can function as a key to access a taxonomy of attributes related to geographic region, country, and related cultural characteristics. Details of these characteristics are provided below. Leveraging the data on cultural characteristics enables activation of the personalization layer of the dynamic content controller which can then determine how to customize the website based on the behavioral and cultural characteristics of the site visitor.

In one embodiment, the cultural interpreter 422 is based on national cultural empirical data collected by Geert Hofstede during his studies of national culture. The original study began in 1967 and covered 70 countries and continues to expand into the present. Data for these studies are stored and available from the Hofstede Center databases. Hofstede conducted an analysis of country values and defined unique characteristics of each that could be identified by primary groupings, or "dimensions." Originally four dimensions were represented and later a fifth dimension was added. These are known as the "dimensions of culture" and have been used by business and academia alike. Brief definitions and accompanying challenges are noted in table 500 shown in FIG. 5. In summary, Hofstede developed five dimensions including a power distance (PDI) dimension 510, an individualism (IDV) dimension 512, a masculinity (MAS) dimension 514, an uncertainty avoidance (UAI) dimension 516, and a long-term orientation (LTO) dimension 518. The dimensions and how they are scaled are described in table 500. Table 600 in FIG. 6 illustrates ranks and scores given for a plurality of countries for each of the five dimensions as calculated by Hofstede. See, for example, the above-referenced G. Hofstede et al., "Cultures and Organizations: Software of the Mind," McGraw Hill Companies (2010).

Thus, with reference back to the dynamic content control stack 400 in FIG. 4, we now describe an illustrative workflow.

Assume that the data collectors 240 collect one or more of the cultural sensor data types described above, e.g., HTTP request headers, geolocation of the site visitor, site visitor interaction with the website, and social network data of the site visitor. This data is stored in datastore 250 (e.g., data 452 and/or 454). The stored data is accessed through the data access layer 245 by the analytics layer 230. One or more of the functions in the analytics layer, e.g., classification 232, clustering 234, etc., are called to identify the country or region from which the site visitor most likely is associated. This country/region result is passed to the personalization layer 220 where the cultural interpreter 422 applies the national cultural assumptions that Hofstede suggests in tables 500 and 600 in order to personalize the content that will be presented to the site visitor in subsequent web pages. This may include content and products recommended (224) and/or placed (226) based on the cultural segment (222) determined for that particular site visitor. Then, the specific content adapted for this site visitor based on the cultural analysis is rendered (412) by the presentation layer 210, i.e., content specifically adapted for the visitor is generated and sent to the visitor's client device for presentation (e.g., audio and/or visual presentation) thereon.

It is to be appreciated that while certain functions are illustratively explained herein as being performed by certain layers and components/modules in FIG. 4 (and FIG. 2 as well), multiple layers and components/modules can be alternately configured to perform parts of one function. By way of example only, the cultural interpretation function (using the Hofstede multidimensional taxonomy) described above may be performed in cooperation between the classification module 232 in analytics layer 230 and the site visitor segmentation module 222 in personalization layer 220.

We now present several scenarios and representative use cases. It is to be appreciated that these examples are mainly from the web analytics and marketing domains, but the concepts could be applied to other domain areas.

Assume a country rated below average on the Hofstede dimensional scale of individualism (IDV). Thus, the assumption would be that the tendency of residents of this country would be collectivistic in nature, meaning that it is "we" based and that residents make decisions based on what is best for the collective, not the individual. Relationships and family are highly valued. If one were to render content for a corporate web page that would be viewed by a site visitor from a collectivist country, e.g., Spain, the site could display images of couples and/or groups of people, not individual people. In a collectivist society, images of an individual may be mistaken for that of a societal outcast, i.e., not one who is welcome, unless framing and narrative provide proper explanations. The dynamic content control stack 400 provides this content control based on the disaggregated cultural data collected and analyzed by the system.

The dynamic content control stack 400 can determine which topics drive engagement from viewers with different cultural characteristics, content interests, and search or view tendencies (e.g., taxes, raises, new product releases, conference announcements, etc.).

The dynamic content control stack 400 can determine how geographic location influences preferences for topics, and thus promote more local speakers and local conferences/events on the website.

Such embodiments enable design improvements for user experience (UX) web design in an automated fashion based on intelligent algorithms and machine learning methods. For example, one or more classifiers can be implemented to infer what culture background that best describes the current visitor based on how he interacts with the website. With the assistance of A/B tests, the website then monitors how the behavior may change when the website is designed toward his culture background. Over time, this mechanism would learn which kinds of content would be appropriate or discordant for certain types of cultural audiences.

As mentioned above, currently, many websites are static, and show the same content regardless of the origin, interests, tendencies or preferences of the site visitor. At most, some companies will localize the content, making the text into a local language, based on a user selection. Advantageously, embodiments of the invention automatically detect characteristics about the site visitor based on their unique attributes and show them custom content, and provide a custom site experience suited to their preferences in an automated fashion. Embodiments provide a much richer and more pleasant user experience, better user engagement and increased user adherence based on a user's unique cultural preferences and background, and also result in greater site affinity, as the website is more sensitive to a user's interests, needs, and predispositions.

In addition, embodiments described herein are important as they pertain to cultural value understanding and its respective implementation in business. Values tend to be culturally specific and a good example is how Asia contrasts with many Western teachings. In Asia, two key cultural values are perseverance and thrift. Western values stated by researchers do not typically include these two values. Programs and product launches not considering such values and how they relate to initiatives and communications are subject to potential failure. Relating to program and product initiatives, web content design is also culture-bound. This refers not only to the content posted but also how the content is organized and classified. People classify information differently in cultures based on their own cultural practices. Because of this, individuals from one culture may have difficulty locating information on a website that was designed by individuals from a different culture. Embodiments described herein help a company to classify and organize materials in a way that appeals to local customers and partners. Cultural considerations may seem subtle, but can have a large impact in terms of congruence with ones expectations, beliefs, preferences, and values, and thus have a strong influence on click through rates, marketing effectiveness, and providing culturally sensitive and effective communication.

As indicated previously, functionality associated with dynamic content generation as disclosed herein can be implemented at least in part in the form of one or more software programs stored in memory and executed by a processor of a processing device such as a computer or a virtual machine.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, data management systems and associated data stores. In addition, presentation, personalization, analytics, data collection, and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a dynamic content controller implemented using at least one processing device comprising a processor coupled to a memory local to the processor such that the dynamic content controller operates as part of an in-memory database system implemented via the processor and the local memory;
the dynamic content controller implementing an in-memory control stack configured to generate personalized content for a user during a current content browsing session associated with a given website visited by the user, the current content browsing session comprising a time period during which the given website is visited by the user;
wherein the in-memory control stack comprises:
a data access layer configured to access multiple types of disaggregated data associated with the given website collected and stored in an in-memory database of the in-memory database system, the disaggregated data comprising cultural sensor data associated with the user that is collected and stored during the current content browsing session using one or more data collectors associated with one or more of a computing device associated with the user and one or more web servers hosting the given website;
an analytics layer coupled to the data access layer and configured to analyze the disaggregated data in accordance with a cultural classification system;
a personalization layer coupled to the analytics layer and configured to perform user segmentation by identifying the user as an individual who likely shares preferences attributable to a particular culture identified from a plurality of cultures based on the analysis of the disaggregated data in accordance with the cultural classification system and to generate personalized content for the user based on the user segmentation;
a presentation layer coupled to the personalization layer and configured to provide a version of the given website displaying the personalized content.

2. The apparatus of claim 1, wherein the cultural sensor data is determined based on one or more of packet data headers, geographic location data, usage interaction data and social media site usage data.

3. The apparatus of claim 1, wherein the analytics layer is configured to determine at least one of a country of origin and a region of origin for the user by analyzing the disaggregated data.

4. The apparatus of claim 3, wherein the cultural sensor data comprises cultural characteristics data comprising at least one of a language used in a referral to the given website and a search engine used that refers the user to the given website, and wherein the analytics layer utilizes the cultural characteristic data to determine the country of origin and the region of origin for the user.

5. The apparatus of claim 3, wherein the cultural sensor data comprises hypertext transfer protocol (HTTP) headers, and wherein the analytics layer utilizes at least one of Accept-Language header fields and X-Forwarded-For header fields from the HTTP headers to determine the country of origin and the region of origin for the user.

6. The apparatus of claim 3, wherein the personalization layer comprises a cultural interpreter configured to apply national cultural assumptions for at least one of the country of origin and the region of origin for the user to generate the personalized content.

7. The apparatus of claim 6, wherein the personalized content comprises one or more culturally-sensitive content recommendations based on the user segmentation and the presentation layer is configured to provide the version of the given website displaying the personalized content by adapting content which would otherwise be displayed on the given website to include the one or more culturally-sensitive content recommendations.

8. The apparatus of claim 6, wherein the personalized content comprises one or more culturally-sensitive advertisement placements based on the user segmentation and the presentation layer is configured to provide the version of the given website displaying the personalized content by adapting content which would otherwise be displayed on the given website to include the one or more culturally-sensitive advertisement placements.

9. The apparatus of claim 1, wherein the cultural classification system comprises at least one of a taxonomy, a set of ontologies and a set of heuristics of cultural characteristics.

10. The apparatus of claim 9, wherein the cultural classification system is determined using a multidimensional cultural table and scales.

11. The apparatus of claim 1, wherein the dynamic content controller is implemented as part of a data management system.

12. The apparatus of claim 1, wherein the dynamic content controller is implemented as part of an information processing system.

13. A method comprising:
accessing, via a dynamic content controller implementing an in-memory control stack, multiple types of disaggregated data associated with a given website collected and stored in an in-memory database of an in-memory database system, the disaggregated data comprising cultural sensor data associated with a user that is collected and stored during a current content browsing session using one or more data collectors associated with one or more of a computing device associated with the user and one or more web servers hosting the given website, the current content browsing session being associated with a given website visited by the user and comprising a time period during which the given website is visited by the user;

analyzing the disaggregated data stored in the in-memory database in accordance with a cultural classification system;

performing user segmentation to identify the user as an individual who likely shares preferences attributable to a particular culture identified from a plurality of cultures based on the analysis of the disaggregated data in accordance with the cultural classification system;

generating personalized content for presentation to the user on the given website during the current content browsing session based on the user segmentation; and providing a version of the given website displaying the personalized content;

wherein the in-memory control stack comprises a data access layer configured to perform the accessing step, an analytics layer coupled to the data access layer and configured to perform the analyzing step, a personalization layer coupled to the analytics layer and configured to perform the user segmentation performance step and the generating step, and a presentation layer coupled to the personalization layer and configured to perform the providing step; and wherein the dynamic content controller is implemented by at least one processing device, the at least one processing device comprising a processor coupled to a memory local to the processor such that the dynamic content controller operates as part of the in-memory database system comprising the in-memory database implemented via the processor and the local memory.

14. The method of claim 13, wherein the given website is not designed to anticipate cultural preferences of potential site visitors.

15. The method of claim 13, wherein analyzing the disaggregated data stored in the in-memory database in accordance with a cultural classification system comprises determining at least one of a country of origin and a region of origin for the user by analyzing the disaggregated data.

16. The method of claim 15, wherein generating the personalized content comprises applying national cultural assumptions for at least one of the country of origin and the region of origin for the user to generate the personalized content.

17. The method of claim 16, wherein the personalized content comprises one or more culturally-sensitive content recommendations based on the user segmentation and providing the version of the given website displaying the personalized content comprises adapting content which would otherwise be displayed on the given website to include the one or more culturally-sensitive content recommendations.

18. The method of claim 16, wherein the personalized content comprises one or more culturally-sensitive advertisement placements based on the user segmentation and providing the version of the given web site displaying the personalized content comprises adapting content which would otherwise be displayed on the given website to include the one or more culturally-sensitive advertisement placements.

19. An article of manufacture comprising a processor-readable storage medium having encoded therein executable code of one or more software programs, wherein the one or more software programs when executed by at least one processing device cause the at least one processing device to implement the steps of:

accessing, via a dynamic content controller implementing an in-memory control stack, multiple types of disaggregated data associated with a given website collected and stored in an in-memory database of an in-memory database system, the disaggregated data comprising cultural sensor data associated with a user that is collected and stored during a current content browsing session using one or more data collectors associated with one or more of a computing device associated with the user and one or more web servers hosting the given website, the current content browsing session being associated with a given website visited by the user and comprising a time period during which the given website is visited by the user;

analyzing the disaggregated data stored in the in-memory database in accordance with a cultural classification system;

performing user segmentation to identify the user as an individual who likely shares preferences attributable to a particular culture identified from a plurality of cultures based on the analysis of the disaggregated data in accordance with the cultural classification system;

generating personalized content for presentation to the user on the given website during the current content browsing session based on the user segmentation; and providing a version of the given website displaying the personalized content during the current content browsing session;

wherein the in-memory control stack comprises a data access layer configured to perform the accessing step, an analytics layer coupled to the data access layer and configured to perform the analyzing step, a personalization layer coupled to the analytics layer and configured to perform the user segmentation performance step and the generating step, and a presentation layer coupled to the personalization layer and configured to perform the providing step; and wherein the dynamic content controller is implemented by the at least one processing device, the at least one processing device comprising a processor coupled to a memory local to the processor such that the dynamic content controller operates as part of the in-memory database system comprising the in-memory database implemented via the processor and the local memory.

20. The article of manufacture of claim 19, wherein analyzing the disaggregated data stored in the in-memory database in accordance with a cultural classification system comprises determining at least one of a country of origin and a region of origin for the user by analyzing the disaggregated data and wherein generating the personalized content comprises applying national cultural assumptions for at least one of the country of origin and the region of origin for the user to generate the personalized content.

* * * * *